Feb. 21, 1961 — V. M. BERGEN — 2,972,344
ADJUSTABLE MOUNTING FOR ROTARY SAW
Filed Oct. 19, 1959 — 5 Sheets-Sheet 1

INVENTOR.
VON M. BERGEN
BY Lyon & Lyon
ATTORNEYS

Feb. 21, 1961 V. M. BERGEN 2,972,344
ADJUSTABLE MOUNTING FOR ROTARY SAW
Filed Oct. 19, 1959 5 Sheets-Sheet 2
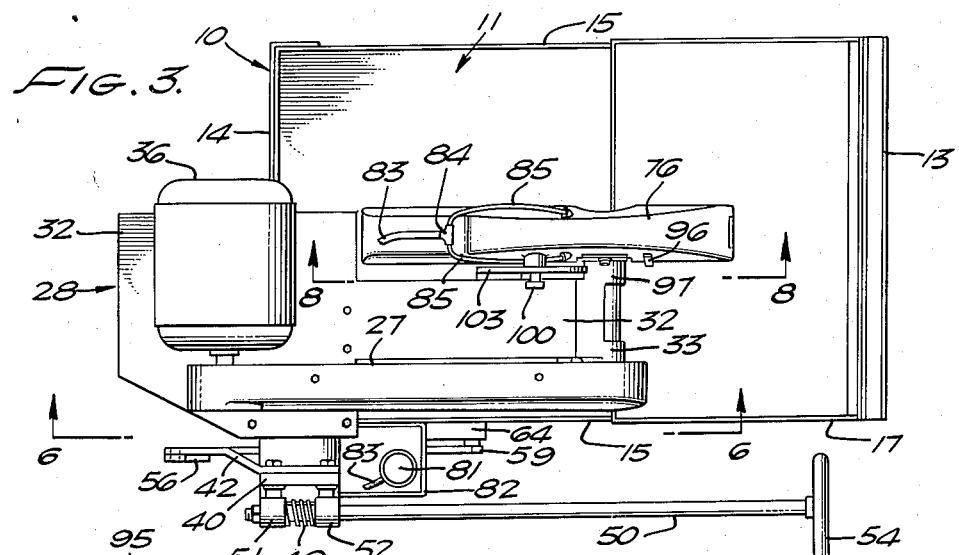
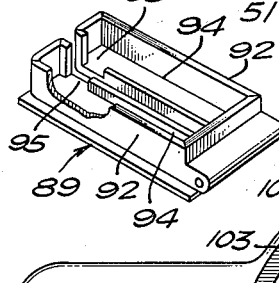
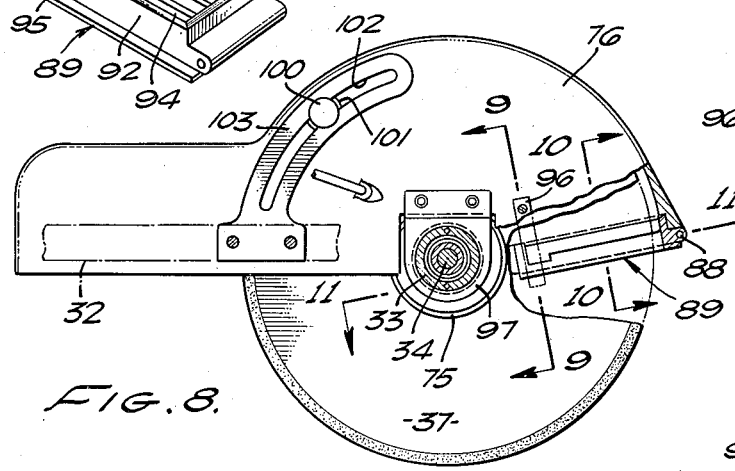
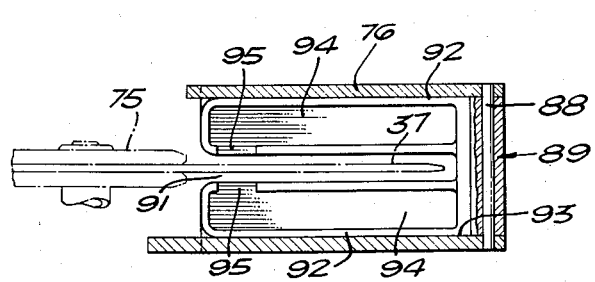
INVENTOR.
VON M. BERGEN
BY
ATTORNEYS

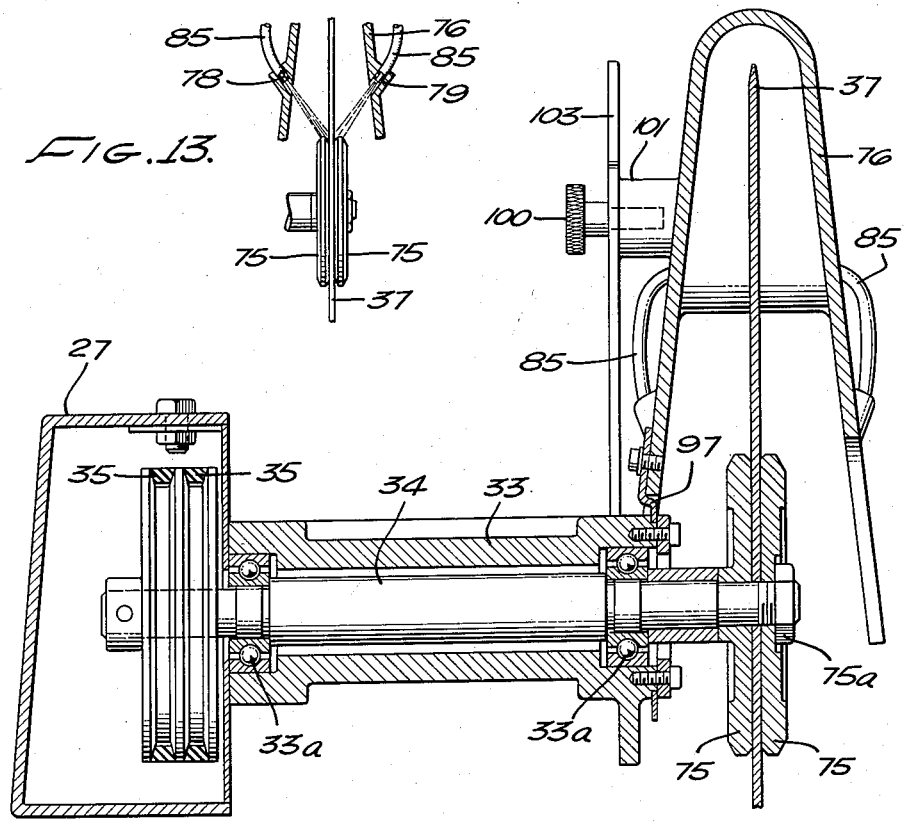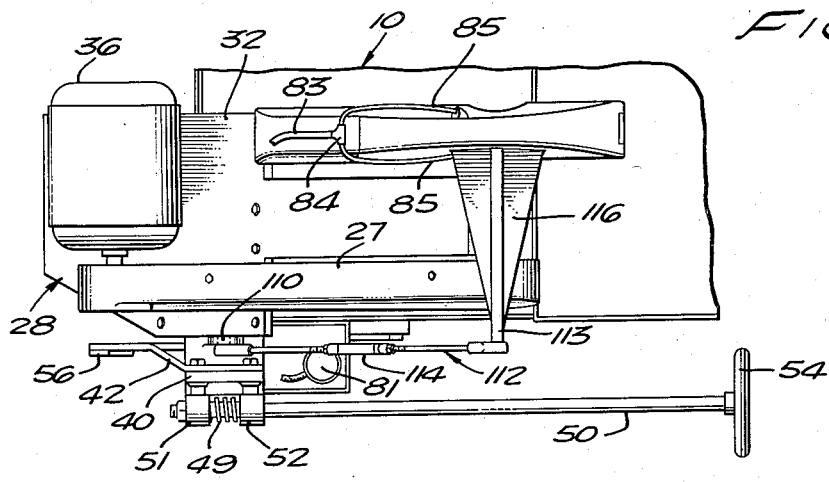

Feb. 21, 1961 V. M. BERGEN 2,972,344
ADJUSTABLE MOUNTING FOR ROTARY SAW
Filed Oct. 19, 1959 5 Sheets-Sheet 5

INVENTOR.
VON M. BERGEN
BY
Lyon & Lyon
ATTORNEYS

United States Patent Office 2,972,344
Patented Feb. 21, 1961

2,972,344
ADJUSTABLE MOUNTING FOR ROTARY SAW
Von M. Bergen, Los Angeles, Calif., assignor to Felker Manufacturing Co., Torrance, Calif., a corporation of California Filed Oct. 19, 1959, Ser. No. 847,236
14 Claims. (Cl. 125—13)

This invention relates to masonry saw apparatus and is particularly directed to improvements in the mounting and control of position of the cutting head and rotary saw. This invention will be described in connection with a rotary saw particularly adapted for cutting hard nonmetallic substances such as concrete, tile, glass block, fire brick, stone, etc., but this is only by way of illustration. This invention is a continuation-in-part of my copending application filed June 2, 1959, Serial No. 817,541.

Conventional masonry saws employ a work-supporting table mounted for horizontal movement on a frame. A horizontal pivot shaft extends transversely between a pair of uprights at the rear of the frame. This pivot shaft carries a tilting platform. A power driven rotary saw blade is mounted at the forward end of the tilting platform and a driving motor is mounted on the rear portion of the tilting platform. The motor rotates the saw blade through a belt drive. The pivot shaft may be supported in any one of a plurality of vertically spaced locations on the frame uprights, in order to accommodate work pieces of different heights. A foot pedal pivoted on the frame is connected through adjustable linkage to control tilting of the platform.

One difficulty of such prior art construction is that the frame uprights which carry the horizontal pivot shaft interfere with large work pieces. The uprights have the effect of limiting the size of the work piece and the length of cut which can be made by the rotary saw blade. Another difficulty is that objectionable springiness develops between the foot pedal and the swinging end of the platform because of the type of mounting of the pivot shaft, and because of the adjustable parts which are required to connect the foot pedal arm to the platform in order to maintain the desired range of travel of the foot pedal for any one of the height positions of the pivot shaft on the frame uprights.

It is a principal object of this invention to provide rotary saw apparatus which eliminates both of these difficulties. Another object is to provide an improved rotary saw apparatus of "open throat" design to permit the use of work pieces of any length or width. Another object is to provide a novel form of rotary saw apparatus having novel means for controlling the height of the saw blade above the table. A more particular object is to provide a device of this type having adjusting mechanism including a worm gear drive operable from a hand control above the level of the table and functioning in conjunction with a foot pedal for controlling the position of the cutting head. Another object is to provide a support for a rotary saw apparatus which is wholly positioned at one side of the path of travel of the work supporting table. Another object is to provide a device of this type in which the pivotal support for the platform remains at a fixed elevation with respect to the frame and table.

Other and more detailed objects and advantages will appear hereinafter.

In the drawings:

Figure 3 is a top plan view.

Figure 7 is a sectional elevation taken substantially on the lines 7—7 as shown in Figure 1.

Figure 8 is a sectional elevation partly broken away taken substantially on the lines 8—8 as shown in Figure 3.

Figures 9, 10 and 11 are sectional views taken substantially on the lines 9—9, 10—10, 11—11 as shown on Figure 8.

Figure 12 is a perspective view of the U-shaped closure member for the blade guard.

Figure 13 is a schematic diagram showing how jets of coolant are directed from the interior of the guard against the retaining hubs and the rotary saw blade.

Figure 14:
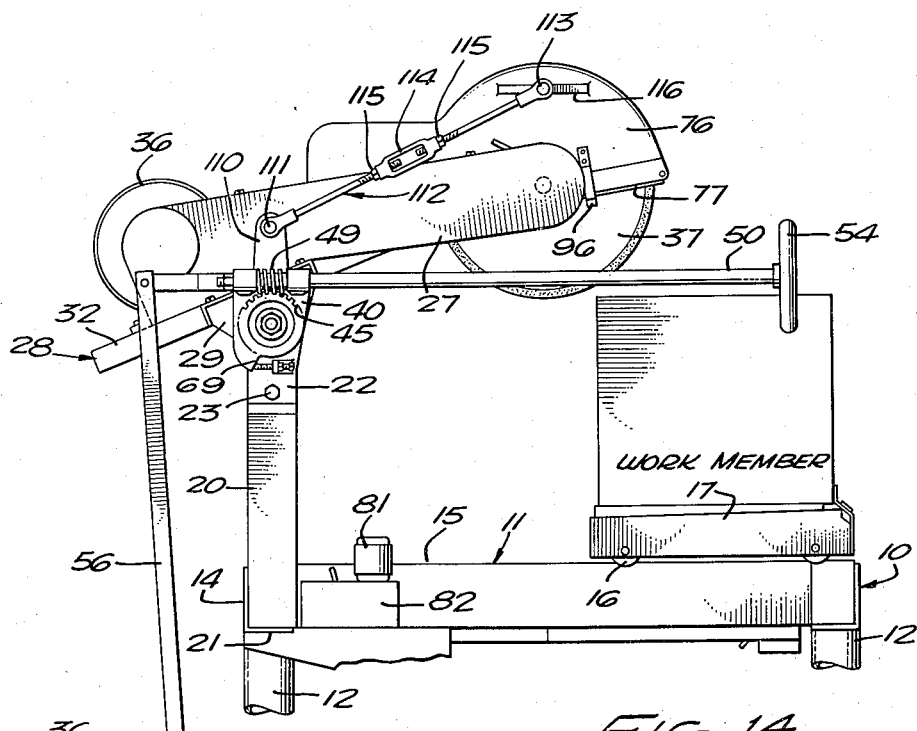
Figure 15:
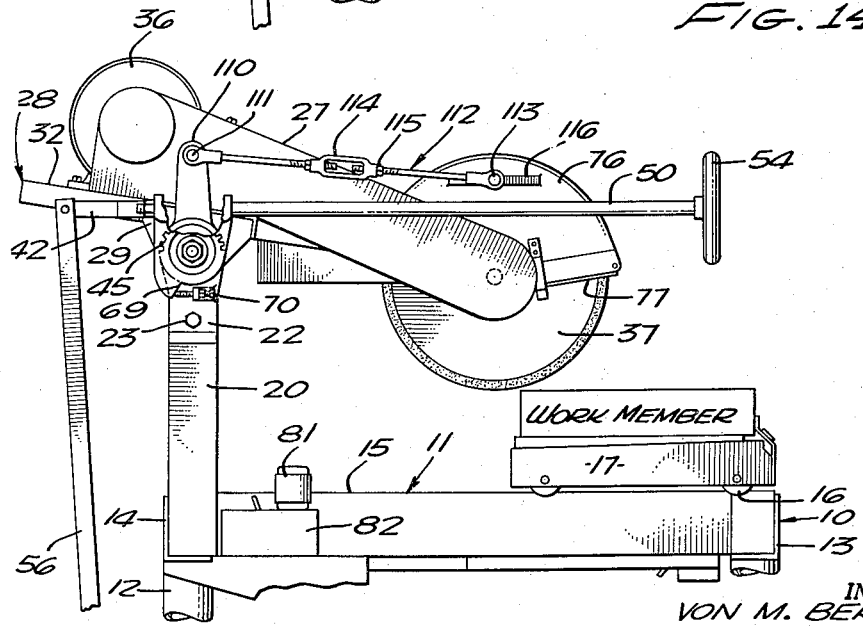

Figures 14 and 15 are side elevations showing the range of adjustment of the initial starting position of the rotary saw blade. Figures 14 and 15 also show a modified form of apparatus for automatically positioning the guard for the rotary saw blade in different angular positions for different elevations of the saw blade, in order to limit forward travel of coolant thrown from the rotary saw blade by centrifugal force.

Figure 16 is a plan view of the modified form of the invention shown in Figures 14 and 15.

Referring to the drawings, the frame generally designated 10 includes a rectangular open top reservoir 11 and is provided with supporting legs 12 at the four corners of the reservoir 11. A bracket 13 connects the front pair of legs 12 and a similar bracket 14 connects the rear pair of legs 12. The ends of the rectangular reservoir 11 are secured to the brackets 13 and 14. The upper edges 15 of the horizontal side members of the reservoir 11 serve as rails for the grooved rollers 16 of the work-supporting table 17.

A vertical support post 20 is positioned at one side of the path of movement of the table 17 and this post 20 is carried on a lateral extension 21 of the rear bracket 14. A stationary support member 22 extends upward from the post 20 and is fixed thereto by means of a releasable bolted connection generally designated at 23. An advantage of the detachable connection between the upright post 20 fixed to the frame 10 and the stationary member 22 supporting the cutting head is that it enables the cutting head and the frame to be transported separately and assembled at the job site. This tends to avoid damage to the moving parts of the cutting head assembly.

Figure 4:
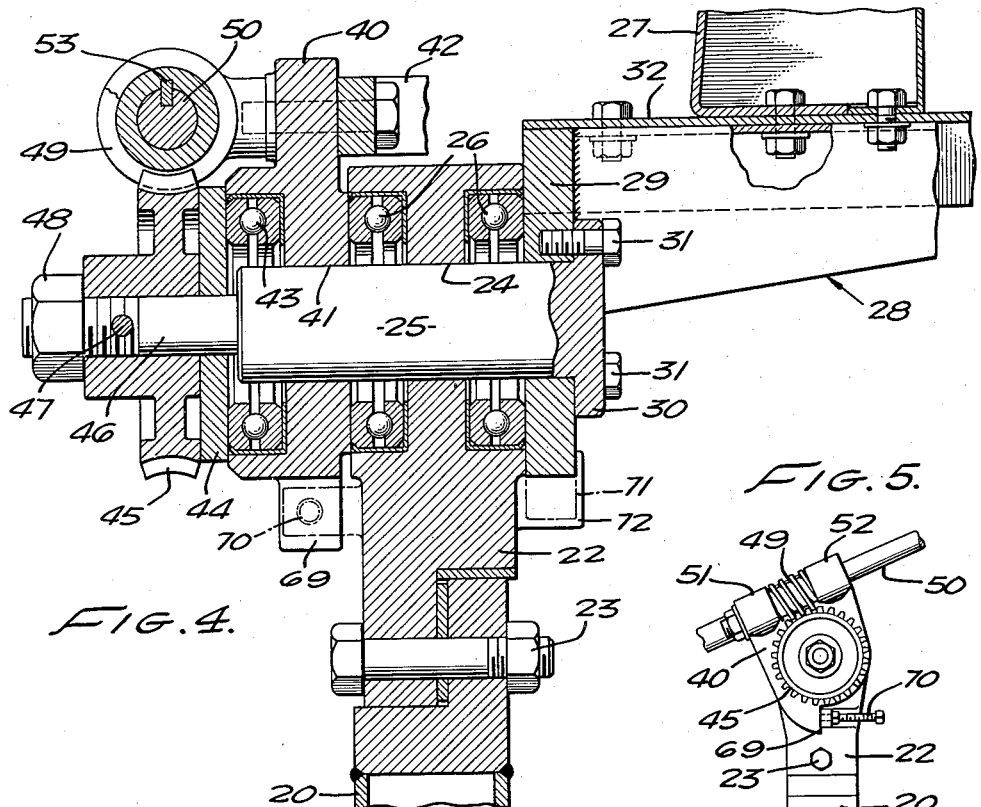
Figure 4 is a sectional view taken substantially on the lines 4—4 as shown on Figure 1.

As shown in Figure 4, this stationary support member 22 is provided with a horizontal bore 24 through which the horizontal pivot shaft 25 extends. Thrust bearing assemblies 26 are carried on the stationary support member 22. A tiltable carrier generally designated 28 includes a side member 29 which is fixed to the shaft 25 by means of the flange 30 and fasteners 31. Carrier 28 includes a platform 32 which carries the bearing housing 33 at its extreme forward end. The high speed shaft 34 is mounted in bearings 33a in this bearing assembly and is driven by means of belts 35 from the driving motor 36. A two-part case 27 encloses the belts 35. The driving motor 36 is mounted on the platform 32 near the rear end thereof. The circular saw blade 37 is clamped to the high speed shaft 34. From this description it will be understood that the carrier 28 including the platform 32, saw blade 27 and motor 36 are carried on the pivot shaft 25.

Means are provided for turning the shaft 25 on its axis, and as shown in the drawings this means includes a ring member 40 having a central bore 41 receiving the shaft 25 for turning movement therein. An actuating arm 42 is fixed to this ring member and extends rearwardly therefrom. A thrust bearing 43 carried by the ring member 40 is engaged by a thrust plate 44 and this plate in turn is engaged by one side of the worm wheel 45. A shaft extension 46 forms an integral part of the shaft 25 and the worm wheel 45 is fixed to this shaft extension 46 by means of a drive pin 47 and the threaded nut 48. Accordingly the worm wheel 45 is fixed relative to the shaft 25 and to the tiltable carrier 28.

A worm pinion 49 meshing with the worm wheel 45 is fixed on a shaft 50 between shaft bearings 51 and 52 carried on the ring member 40. A key 53 prevents relative rotation of the shaft 50 and worm pinion 49. A hand wheel 54 is provided on the forward end of the shaft 50. Turning of the hand wheel 54 turns the worm pinion 49 with respect to the worm wheel 45 and results in changing the relative angular position of the ring member 40 and the tiltable carrier 28.

Figures 1, 2:
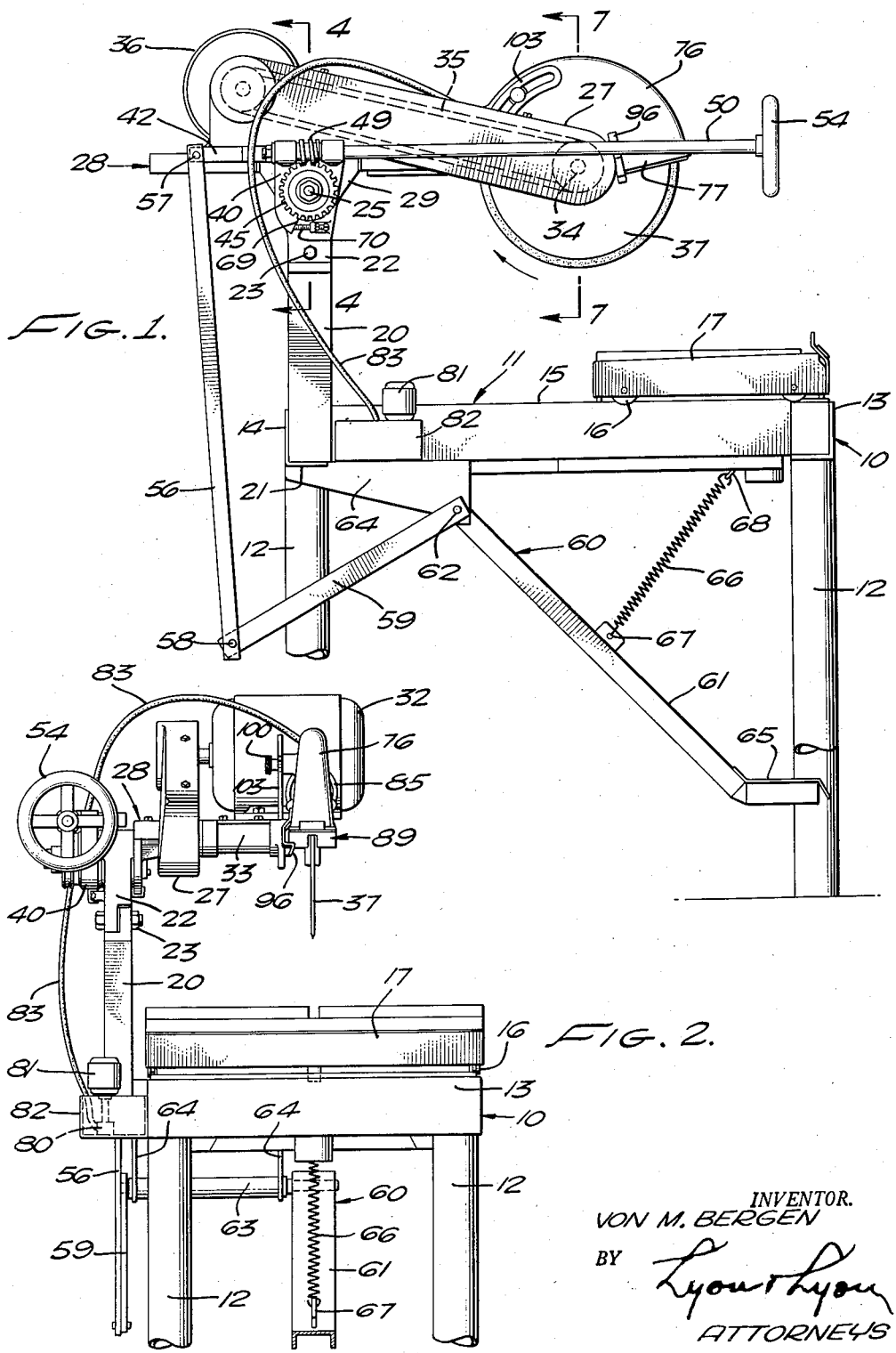
Figure 1 is a side elevation showing a preferred embodiment of this invention.
Figure 2 is a front elevation thereof.

A link 56 has a pivotal connection 57 with the arm 42 and a pivotal connection 58 with the crank arm 59 of the pedal assembly generally designated 60. This pedal assembly 60 includes the crank arm 59 and the pedal arm 61 and the torque shaft 62 which is fixed to both arms 59 and 61. This shaft 62 extends through a tubular bearing member 63 which is fixed to the frame members 64. These frame members 64 are fixed to the bracket 14 connecting the rear legs 12. A pedal 65 is provided on the lower forward end of the pedal arm 61 in a position between the forward legs 12. A coil spring 66 is connected to the pedal arm 61 at 67 and is connected to the frame at 68. This spring 66 serves to counterbalance the tilting platform and to maintain the shoulder 69 on the support ring 40 in contact with the adjustable stop 70 of the post member 22. When the pedal 65 is depressed against the action of the spring 66, the link 56 acts under compression to rotate the ring member 40 in a clockwise direction as viewed in Figure 1. This serves to lower the forward end of the platform 32 and saw blade 37 toward the table 17. Downward motion of the platform 32 and saw blade 37 is arrested when the shoulder 71 on the member 29 strikes the stationary stop 72 on the post member 22.

Figure 5:
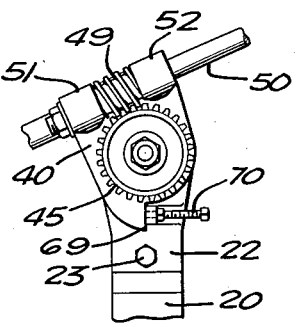
Figure 5 is a fragmentary side elevation of a portion of the apparatus shown in Figure 1, the adjustable stop being fully retracted.
Figure 6:
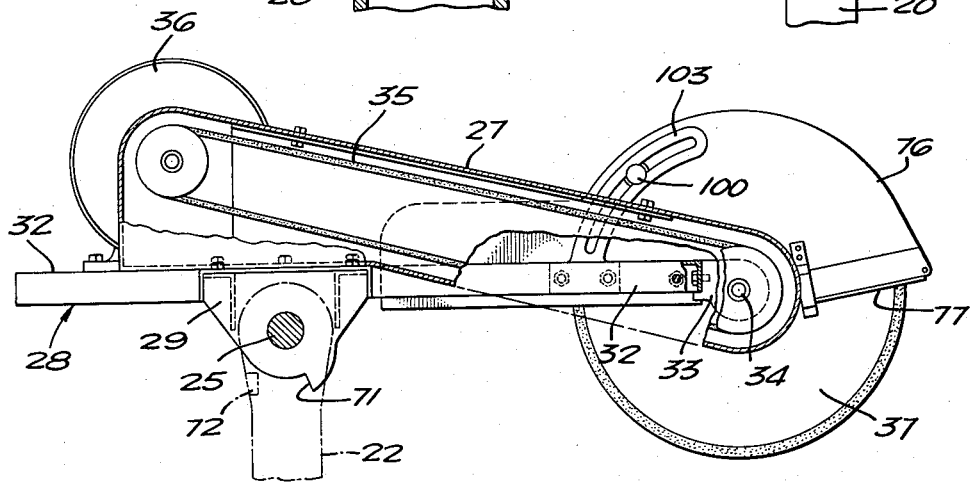
Figure 6 is a fragmentary elevation taken substantially on the lines 6—6 as shown in Figure 3.

It will be noted that this construction returns the foot pedal 65 to the same elevation regardless of the adjusted height of the saw blade 37. Moreover this result is achieved without requiring the use of any adjustable length or height connections between the pivot shaft 25 and the frame 10 or between the link 56 and one of its pivotal connections 57 or 58. Objectionable "springiness" is minimized and the number of parts in the actuating linkage is substantially reduced. The adjustable stop 70 is shown fully retracted in Figure 5 permitting maximum elevation of the control shaft 50.

The rotary saw blade 37 operates in a vertical plane and may be of conventional form. It may have diamond impregnated segments on its outer periphery or may comprise any other conventional type of abrasive circular saw. The blade 37 is fixed to the high speed shaft 34 by conventional clamping collars 75 and nut 75a. The upper portion of the blade 37 is enclosed within a guard 76. The blade 37 rotates in the direction of the arrow shown in Figure 1 and a straight forward edge 77 of the guard 76 is preferably inclined from the horizontal at a small angle. Liquid coolant is directed into the interior of the guard 76 through nozzles 78 and 79 provided in the side faces of the guard 76 and this coolant is directed against the collars 75 and the blade 37.

The coolant is carried downward by the rotating blade 37 and is collected in the open top reservoir 11. The coolant is recirculated by means of a sump pump 80 driven by an electric motor 81. The pump 80 is positioned within a receptacle 82 secured to one of the side walls of the reservoir 11 and placed in communication therewith by means of openings (not shown). Coolant delivered by the pump 80 passes through flexible tube 83 to the T fitting 84 and then through tubes 85 to the nozzles 78 and 79. At its extreme forward end the guard 76 carries a pivot pin 88 which supports a U-shaped closure 89 within the exit opening 90 of the guard 76. The closure 89 is provided with a central slot 91 which provides running clearance for the saw blade 37. The upstanding walls 92 of the closure 89 are recessed into pockets 93 provided in the walls of the guard 76, and this serves to minimize escape of coolant along the joint surfaces between the closure 89 and the guard 76. Parallel troughs 94 retain coolant which would otherwise be thrown outward through the opening 90 by the rotating saw blade 37 and these troughs 94 have outlet openings 95 through which coolant is discharged near the radially inner portion of the rotary blade 37. A spring clip 96 is fixed on the outer surface of the guard 76 and serves to hold the closure 89 in position.

The guard 76 is adjustably mounted to turn about the axis of the high speed shaft 34. This may be accomplished by means of bracket 97 fixed to the guard 76 which pivotally supports the guard on the bearing carrier 33 at the forward end of the platform 32. The guard may be held in adjusted angular position by means of the clamping screw 100 mounted on boss 101 fixed on the guard 76. This clamping screw passes through an arcuate slot 102 provided on the bracket 103 fixed to the tilting platform 32.

In operation, the rolling table 17 supports the work to be cut, and the vertical position of the power driven saw blade 37 is adjusted by turning the hand wheel 54. The angular position of the guard 76 is adjusted and clamped by means of the screw 100. The counterbalance spring 66 acting on the pedal arm 61 maintains the hand wheel shaft 50 in substantially horizontal position, with the shoulder 69 in engagement with the stop 70. Figure 14 shows the parts of the device in position for cutting a tall work member. Figure 15 shows parts in another position for cutting a short work member. The rotary saw 37 may be lowered by manually pushing downward on the hand wheel 54 in opposition to the counterbalanced spring 66, or the pedal 65 may be used to accomplish the same purpose.

It is necessary to change the angular position of the guard 76 with respect to the tilting platform 32 when making cuts on tall work members as compared to making cuts on short work members, in order that the exit edge 77 be maintained at substantially the desired angle. If the angle is too steep, the coolant may be directed forwardly to an extent to cause discomfort to the operator standing at the forward edge of the frame 10. If the angle of the exit edge 77 is too small or if it inclines rearwardly insufficient quantities of coolant may be directed against the work member.

In Figures 14–16 there is shown a modified form of guard adjusting device which replaces the clamping nut 100 in the arcuate bracket 103. A stationary finger 110 is fixed on the post extension 22 and is connected at 111 to a link generally designated 112. The link 112 is pivotally connected to pin 113. The link 112 may include a turn-buckle 114 and lock nuts 115 in order to adjust the effective length of the link 112. A bracket 116 carries the pin 113 and this bracket is fixed to the outer surface of the guard 56. In this modified form of the device the guard 76 turns relative to the swinging end of the platform 32 so that the exit edge 77 remains at substantially the same inclination regardless of the elevation of the saw blade 37 above the table 17.

Having fully described my invention, it is to be understood that I do not wish to be limited to the details set forth herein but my invention is of the full scope of the appended claims.

I claim:

1. In a mounting for a rotary saw, the combination of: a frame having a stationary support member thereon, a horizontal shaft mounted for turning movement on the support member, a tiltable carrier fixed to the shaft, power operated rotary saw means on the tiltable carrier, a ring member mounted for pivotal movement about the shaft axis, a worm wheel element fixed upon the shaft, a worm pinion rotatably mounted on the ring member and meshing with the worm wheel, means connected to the ring member for turning it about the shaft axis, and means for turning the worm pinion to adjust the angular position of the tiltable carrier with respect to the ring member.

2. In a mounting for a rotary saw, the combination of: a frame having a table movably mounted thereon, a stationary support member on the frame at one side of the path of movement of the table, a horizontal shaft mounted for turning movement on the support member, a tiltable carrier fixed to the shaft, power operated rotary saw means on the tiltable carrier for cutting a work piece supported by said table, a ring member mounted for pivotal movement about the shaft axis, foot operated means on the frame connected to the ring member for oscillating the shaft, a worm wheel element fixed upon the shaft, a worm pinion rotatably mounted on the ring member and meshing with the worm wheel element, means connected to the ring member for turning it about the shaft axis, and means for turning the worm pinion to adjust the angular position of the tiltable carrier with respect to the ring member.

3. In a mounting for a rotary saw, the combination of: a frame having a table movably mounted thereon, a stationary support member on the frame at one side of the path of movement of the table, a horizontal shaft mounted for turning movement on the support member, a tiltable carrier fixed to the shaft, power operated rotary saw means on the tiltable carrier for cutting a work piece supported by said table, a ring member mounted for pivotal movement upon the shaft, means including a foot pedal on the frame and connected to the ring member for oscillating the latter, a worm wheel element fixed upon the shaft, a worm pinion rotatably mounted on the ring member and meshing with the worm wheel element, and means for turning the worm pinion to adjust the angular position of the tiltable carrier with respect to the ring member.

4. In a mounting for a rotary saw, the combination of: a frame having a table movably mounted thereon, a stationary support member on the frame at one side of the path of movement of the table, a horizontal shaft mounted for turning movement on the support member, a tiltable carrier fixed to the shaft at one end thereof, power operated rotary saw means carried on a swinging end of the tiltable carrier for cutting a work piece supported by said table, a ring member mounted for pivotal movement about the shaft axis, means including foot pedal means on the frame connected to the ring member for oscillating the latter, a worm wheel element fixed upon the other end of the shaft, a worm pinion rotatably mounted on the ring member and meshing with the worm wheel spring means extending between the foot pedal and the frame acting in a direction to raise the saw means away from the table, and means for turning the worm pinion to adjust the angular position of the tiltable carrier with respect to the ring member.

5. In a mounting for a rotary saw, the combination of: a frame having a stationary support thereon, a tiltable carrier, a power operated rotary saw mounted upon said tiltable carrier, pivot means mounting said tiltable carrier upon said stationary support, a member mounted to turn about the pivot axis, means whereby turning of said member may be restrained, a worm wheel fixed relative to said tiltable carrier, and a worm pinion meshing with said worm wheel and rotatably mounted upon said member, a shaft and a hand wheel on the shaft for turning the worm pinion to change the relative angular position of said member and said tiltable carrier, and whereby the carrier may be tilted by swinging the hand wheel and shaft about said pivot axis in opposition to the restraining means.

6. In a mounting for a rotary saw, the combination of: a frame having a stationary support thereon, a tiltable carrier, a power operated rotary saw mounted upon said tiltable carrier, pivot means mounting said tiltable carrier upon said stationary support, a member mounted to turn about the pivot axis, foot operated linkage means for turning said member, a worm wheel fixed relative to said tiltable carrier, and a worm pinion meshing with said worm wheel and rotatably mounted upon said member, a shaft and a hand wheel on the shaft for turning said worm pinion to change the relative angular position of said member and said tiltable carrier, and whereby the carrier may be tilted by swinging the hand wheel and shaft about said pivot axis or by actuation of said foot operated means.

7. In a mounting for a rotary saw, the combination of: a frame having a stationary support thereon, a tiltable carrier, a power operated rotary saw mounted upon said tiltable carrier, pivot means mounting said tiltable carrier upon said stationary support, a member mounted to turn about the pivot axis, stop means limiting angular movement of the member relative to the stationary support, foot operated linkage means for turning said member, a worm wheel fixed relative to said tiltable carrier, and a worm pinion meshing with said worm wheel and rotatably mounted upon said member, a shaft and a hand wheel on the shaft for turning said worm pinion to change the relative angular position of said member and said tiltable carrier, and whereby the carrier may be tilted by swinging the hand wheel and shaft about said pivot axis or by actuation of said foot operated means.

8. In a mounting for a rotary saw, the combination of: a frame having a stationary support member thereon, a tiltable carrier having power operated rotary saw means thereon, horizontal pivot means supporting the carrier on the support member, a ring member mounted for movement about the axis of said pivot means, foot operated means on the frame connected to turn the ring member, angularly adjustable means operatively connecting the ring member and the carrier for movement in unison, and stop means on the support member for limiting angular movement of the ring member in a direction corresponding to raising of the rotary saw means.

9. In a mounting for a rotary saw, the combination of: a frame having a stationary support member thereon, a horizontal shaft mounted for turning movement on the support member, a tiltable carrier fixed to the shaft, power operated rotary saw means on the tiltable carrier, a ring member mounted for pivotal movement about the shaft axis, foot operated means on the frame connected to turn the ring member, angularly adjustable means operatively connecting the ring member and the shaft for movement in unison, and a shoulder on the ring member engageable with a stop on the support member for limiting angular movement of the ring member in a direction corresponding to raising of the rotary saw means.

10. In a mounting for a rotary saw, the combination of: a frame having a stationary support member thereon, a horizontal shaft mounted for turning movement on the support member and having an end flange, a tiltable carrier fixed to said end flange, power operated rotary saw means on the tiltable carrier, a ring member mounted for pivotal movement about the shaft, foot operated means on the frame connected to turn the ring member, angularly adjustable means operatively connecting the ring member and the shaft for movement in unison, stop means on the support member for limiting angular movement of the ring member in a direction corresponding to raising of the rotary saw means.

11. In a mounting for a rotary saw, the combination of: a frame having a stationary support member thereon, a horizontal shaft mounted for turning movement on the support member, a tiltable carrier fixed to the shaft, power operated rotary saw means on the tiltable carrier, a ring member mounted for pivotal movement about the shaft axis, foot operated means on the frame connected to turn the ring member, angularly adjustable means operatively connecting the ring member and the shaft for movement in unison, a shoulder on the ring member engageable with a stop on the support member for limiting angular movement of the ring member in a direction corresponding to raising of the rotary saw means, and a spring resiliently acting on the foot operated means for maintaining said shoulder in contact with said stop.

12. In a mounting for a rotary saw, the combination of: a frame having a table mounted for horizontal movement thereon, a stationary support member laterally positioned on the frame at one side of the path of movement of the table, a tiltable carrier, power operated rotary saw means on a swinging end of the tiltable carrier for cutting a work piece supported by said table, means mounting the carrier for pivotal movement on the support member about a horizontal axis, a ring member mounted for pivotal movement about the said axis, angularly adjustable means operatively connecting the ring member and the carrier for movement in unison, and means including a foot pedal mounted on the frame and connected to oscillate the ring member.

13. In a mounting for a rotary saw, the combination of: a frame having a table movably mounted thereon, a stationary post laterally positioned on the frame at one side of the path of movement of the table, a stationary support member detachably connected to the post and extending upward therefrom, a tiltable carrier, power operated rotary saw means on a swinging end of the tiltable carrier for cutting a work piece supported by said table, means mounting the carrier for pivotal movement on the support member about a horizontal axis, a ring member mounted for pivotal movement about the said axis, angularly adjustable means operatively connecting the ring member and the carrier for movement in unison, and means including a foot pedal mounted on the frame and connected to oscillate the ring member.

14. In a mounting for a rotary saw, the combination of: a frame having a table movably mounted thereon, a stationary post laterally positioned on the frame at one side of the path of movement of the table, a stationary support member detachably connected to the post and extending upward therefrom, a tiltable carrier, power operated rotary saw means on a swinging end of the tiltable carrier for cutting a work piece supported by said table, means mounting the carrier for pivotal movement on the support member about a horizontal axis, a ring member mounted for pivotal movement about the said axis, a worm pinion carried on the ring member meshing with a worm wheel fixed on the carrier, and means including a foot pedal mounted on the frame and connected to oscillate the ring member.

References Cited in the file of this patent

UNITED STATES PATENTS

| | | |
|---|---|---|
| 1,095,399 | Huntington | May 5, 1914 |
| 1,332,558 | Kaetker | Mar. 2, 1920 |
| 2,320,743 | Nilsen | June 1, 1943 |
| 2,441,535 | Sanders | May 11, 1948 |
| 2,818,058 | Zuzelo | Dec. 31, 1957 |